United States Patent [19]

Jablonski

[11] 4,434,274

[45] Feb. 28, 1984

[54] VULCANIZABLE COMPOSITIONS OF HALOGEN AND CARBOXYL CONTAINING ACRYLATE ELASTOMERS, 2,5-DIMERCAPTO-1,3,4-THIADIAZOLE, A GROUP IVA METAL OXIDE OR SALT AND A TETRAALKYL THIURAM SULFIDE

[75] Inventor: Dane E. Jablonski, Brunswick, Ohio

[73] Assignee: The B. F. Goodrich Company, Akron, Ohio

[21] Appl. No.: 367,633

[22] Filed: Apr. 12, 1982

[51] Int. Cl.$^3$ .................. C08F 8/34; C08F 220/22
[52] U.S. Cl. ......................... 525/349; 525/329.5; 525/329.7; 525/330.4; 525/352
[58] Field of Search .......... 525/329.7, 330.4, 349, 525/352, 329.5

[56] References Cited

U.S. PATENT DOCUMENTS

| | | | |
|---|---|---|---|
| 3,622,547 | 11/1971 | Ermidis | 525/352 |
| 3,919,143 | 11/1975 | Morris | 525/352 |
| 4,248,985 | 2/1981 | Ohishi | 525/349 |
| 4,288,576 | 9/1981 | Richwine | 525/349 |

*Primary Examiner*—C. A. Henderson
*Attorney, Agent, or Firm*—J. Hughes Powell, Jr.

[57] ABSTRACT

Dual cure site acrylate elastomers containing both active halogen and carboxyl groups are compounded with a combination of 2,5-dimercapto-1,3,4-thiadiazole, a Group IVA metal oxide or salt thereof and a tetraalkyl thiuram sulfide to provide compounds having an excellent scorch/cure rate balance and balance of desirable physical properties in the vulcanizates thereof.

3 Claims, No Drawings

VULCANIZABLE COMPOSITIONS OF HALOGEN AND CARBOXYL CONTAINING ACRYLATE ELASTOMERS, 2,5-DIMERCAPTO-1,3,4-THIADIAZOLE, A GROUP IVA METAL OXIDE OR SALT AND A TETRAALKYL THIURAM SULFIDE

BACKGROUND OF THE INVENTION

Acrylate rubbers and elastomers that contain both halogen and carboxyl cure sites are known. U.S. Pat. No. 3,910,866 describes the vulcanization of such elastomers with a combination of an alkali metal oxy compound and a quaternary ammonium salt, a tertiary amine or a guanidine. U.S. Pat. No. 3,875,092 discloses the cure of such dual cure site acrylate elastomers with a quaternary ammonium salt. While these and other cure systems have been used to vulcanize the halogen and carboxyl containing acrylate elastomers, improved cure systems are desired that will provide a better balance of physical properties in the vulcanizates as well as an improved scorch/cure rate balance.

SUMMARY OF THE INVENTION

Acrylate rubber compositions containing both halogen and carboxyl cure sites having an improved scorch/cure rate balance, and physical property balance in the resulting vulcanizates, are obtained when the acrylate rubbers are compounded with a combination of 2,5-dimer-capto-1,3,4-thiadiazole, a Group IVA metal oxide or salt thereof and a tetraalkyl thiuram sulfide.

DETAILED DESCRIPTION

The acrylate rubbers are interpolymers comprising at least one acrylic ester monomer, a reactive halogen-containing monomer, and a carboxyl-containing monomer.

The acrylate rubbers contain from about 40% to about 98% by weight, based upon the weight of the polymer, of an acrylic ester of the formula

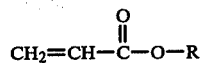

wherein R is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can be primary, secondary, or tertiary. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate; methylthioethylacrylate, hexylthioethylacrylate, and the like; and α and β-cyanoethyl acrylate, α,β and γ-cyanopropyl acrylate, cyanobutyl acrylate, cyanohexyl acrylate, cyanooctyl acrylate, and the like. Mixtures of two or more monomers and/or types of acrylate monomers are employed.

Preferredly, the rubbers contain from about 65% to about 98% by weight of acrylates of the formula wherein R is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like; and methoxyethyl acrylate, ethoxyethyl acrylate, and the like. Both an alkyl acrylate and an alkoxyalkyl acrylate can be used.

The rubbers contain from about 0.1% to about 30% by weight of an active halogen-containing monomer. The halogen groups can be chlorine, bromine or iodine. These monomers are generally (1) halogen-containing vinylene hydrocarbons and (2) halogen-containing vinyl monomers having the halogen group at least two carbon atoms removed from an oxygen atom(s). Examples of (1) are vinyl benzyl chloride, vinyl benzyl bromide, 2-chloromethyl-5-norbornene, 2-bromomethyl-5-norbornene, 2-β-chloroethyl-5-norbornene, and the like; (2) are characterized by having ether (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, cyclol chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 2-chloroacetoxymethyl-5-norbornene, 2-(α,β-dichloropropionylmethyl)-5-norbornene, and the like.

More preferably, the rubber contains from about 0.2% to about 15% by weight of the active halogen-containing monomer. At this level, the halogen content is from about 0.1% to about 5% by weight of the rubber. Due to availability and cost, the chlorine-containing monomers are preferred. Examples of the more preferred monomers are vinyl chloroacetate, allyl chloroacetate, 2-chloroethyl acrylate, 2-chloroethyl vinyl ether, 3-chloropropyl acrylate, cyclol chloroacetate, chloromethyl vinyl ketone, vinyl benzyl chloride, 2-chloromethyl-5-norbornene, 2-chloroacetoxymethyl-5-norbornene.

The rubbers also contain from about 0.1% to about 20% by weight of a carboxyl-containing monomer. The monomer can be monocarboxylic or poly-carboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene ($CH_2<$) group. Examples of such are phenyl acrylate, cyclohexyl acrylate, methacrylates such as methyl methacrylate, ethyl methacrylate, octyl methacrylate, and the like; vinyl and allyl esters such as vinyl acetate, vinyl propionate, allyl acetate, and the like; alkyl vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, chlorostyrene, vinyl toluene, and the like; vinyl chloride, vinylidene chloride; alkyl fumarates, vinyl nitriles such as acrylonitrile and methacrylonitrile; vinyl amides such as acrylamide, methacrylamide, N-methylol acrylamide, and the like; and dienes and divinyls such as butadiene, isoprene, divinyl benzene, divinyl ether, diethylene glycol diacrylate, glycidyl acrylate and methacrylate, and the like. The more preferred copolymerizable monomers are vinyl acetate, methyl methacrylate, ethyl methacrylate, styrene, acrylonitrile, acrylamide, and diethylene glycol diacrylate.

The acrylate rubbers can be prepared using emulsion, suspension, solution, and bulk techniques known to those skilled in the art. It is convenient to polymerize the monomers to 90 percent conversion or more by emulsion and suspension techniques. The polymerization can be performed as a batch reaction, continuous, or one or more ingredients can be proportioned during the run. Temperature of polymerization ranges from about −10° C. to about 100° C., whereas a more preferred range is from about 5° C. to about 80° C.

The polymerization can be initiated by free-radical generating agents. Examples of such agents are inorganic peroxides and organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art, including alkali alkyl sulfonates, aralkyl sulfonates and polyglycol fatty acids.

The polymerization normally is continued until about 95% conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, spray drying and freeze agglomeration techniques. The rubber is usually washed with water and dried.

The acrylate rubbers are solid elastomers having a dilute solution viscosity (DSV) of over 0.5 as measured on 0.2 gram of rubber in 100 ml. benzene at 25° C. Raw polymer Mooney values (ML-4, at 212° F.) are from about 20 to about 125.

The rubbers are admixed with cure ingredients and compounding ingredients using two-roll mills, internal mixers such as Banburys and extruders, and like equipment.

The metal oxide or salt used is a metal of Group IVA of the Periodic Chart of the elements and preferably is lead or tin. Typical materials that have been found to be useful in the practice of the invention include dibasic lead oxide, $2PbO.PbHPO_3.\frac{1}{2}H_2O$, salts of acids containing 2 to 20 carbon atoms, i.e., the fatty acid series such as lead acetate, lead ethyl hexanoate, lead stearate, stannous stearate, stannous octoate, and the like. Dibasic lead stearate and stannous stearate are preferred materials.

The tetraalkyl thiuram sulfide used include the monosulfide, disulfide, tetrasulfide and hexasulfide; however, the disulfide is preferred to provide the best balance of desirable properties in the compound and vulcanizates. The alkyl group may contain from 1 to 6 carbon atoms as methyl, ethyl, propyl, butyl and the like. While any of these tetraalkyl thiuram disulfides may be used, a better balance of properties in the compound and vulcanizate is observed when the tetrabutyl disulfide derivative is used.

The amounts and ratios of 2,5-dimercapto-1,3,4-thiadiazole, IVA metal compound and tetraalkyl thiuram sulfide may be varied widely to obtain a variety of properties. A particularly useful range is from about 0.4 to about 2.0 weight part of 2,5-dimercapto-1,3,4-thiadiazole, about 0.5 to about 2.0 weight part of the IVA metal compound and about 1.5 to about 4 weight parts of the tetraalkyl thiuram sulfide per 100 weight parts of acrylate rubber. Excellent results have been obtained with about 0.5 to 1.0 weight part of thiadiazole, about 2 to 3 weight parts of tetrabutyl thiuram disulfide and about 0.5 to 1.5 weight parts of fatty acid salt of lead or tin.

The acrylate rubbers can be admixed with many other rubber compounding ingredients. Examples of such ingredients are fillers such as the carbon blacks, silica, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like; petroleum oils, castor oil, tall oil, glycerin, and the like; antioxidants and stabilizers such as phenyl-B-naphthylamine, 2,6-di-t-butyl paracresol, 2,2'-methylenebis(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl) isocyanurate, tetrakis-methylene-3(3',5'-di-t-butyl-4'-hydroxyphenyl ) propionate methane, distearyl thiodipropionate, tri (nonylatedphenyl) phosphite, and the like; and other ingredients such as processing aids, pigments, tackifiers, flame retardants, fungicides, and the like.

The novel compositions are cured at temperatures from about 250° F. to about 450° F., whereas a more preferred range is from about 275° F. to about 400° F. Cure times vary inversely as temperature, and range from about 1 minute to about 60 minutes or more.

The vulcanizates were evaluated as to their compression set (ASTM D395), tensile and elongation (ASTM D412), and hardness (ASTM D2240-durometer A). Cure times were determined using a Mooney Viscometer (ASTM D1646) with a large rotor, or using a Monsanto Rheometer (ASTM D2084). The samples were press cured and then oven cured.

The following examples serve to more fully illustrate the practice of the invention.

EXAMPLE 1

The acrylate rubber of this example contains 98 weight percent ethyl acrylate, 1.6 weight percent vinyl benzyl chloride and 0.4 weight percent methacrylic acid. The rubber had a Mooney value of 50 ML. A masterbatch containing the rubber, processing aid, stearic acid and carbon black was prepared in an internal mixer. The curing agents including different lead and tin compounds as shown in the table were added to masterbatch portions and the compounds tested amd cured as shown in the Table 1.

TABLE I

| Compound | 1 | 2 | 3 | 4 |
|---|---|---|---|---|
| Acrylate Rubber | 100 | 100 | 100 | 100 |
| Processing Aid* | 2 | 2 | 2 | 2 |
| Stearic Acid | 1 | 1 | 1 | 1 |
| Philblack N-550** | 65 | 65 | 65 | 65 |
| 2,5-dimercapto-1,3,4-thiadiazole | 0.6 | 0.6 | 0.6 | 0.6 |
| Tetrabutyl thiuram disulfide | 2.5 | 2.5 | 2.5 | 2.5 |
| $2PbO \cdot PbHPO_3 \cdot \frac{1}{2}H_2O$ | 1.0 | — | — | — |
| Lead Stearate | — | 1.0 | — | — |
| Stannous Stearate | — | — | 1.0 | — |
| Lead Acetate | — | — | — | 0.5 |
| Mooney Viscometer (125° C., Large Rotor) | | | | |
| Minimum | 40 | 47 | 89 | 50 |
| $T_5$, minutes | 22.3 | 9.0 | 8.9 | 7.8 |
| $T_{35}$, minutes | >30 | 15.7 | 28.5 | >30 |
| Rheometer (12', 190° C., Micro Die) | | | | |
| $M_L$, (in-lb) | 4.5 | 5.0 | 8.5 | 5.5 |
| $M_H$, (in-lb) | 23.0 | 22.0 | 23.3 | 20.2 |
| $M\Delta$, (in-lb) | 18.5 | 17.0 | 14.8 | 14.7 |
| $t_1$, minutes | 1.1 | 0.9 | 0.4 | 0.8 |
| $t^190$, minutes | 5.6 | 3.7 | 3.8 | 5.2 |
| Press Cure (3', 190° C.) | | | | |
| Modulus 100%, psi | 600 | 700 | 870 | 750 |
| Tensile, psi | 1530 | 1600 | 1800 | 1500 |
| Elongation, % | 330 | 300 | 240 | 270 |
| Hardness-A | 79 | 75 | 73 | 75 |
| % C.S.*** (70 hr/150° C.) | | | | |
| 6' Button | 60 | 53 | 58 | 63 |
| Post Cure (4 hr., 175° C.) | | | | |
| $M_{100}$, psi | 1170 | 1150 | 980 | 980 |
| Tensile, psi | 2100 | 2030 | 1980 | 1820 |
| Elongation, % | 180 | 200 | 200 | 200 |
| Hardness-A | 83 | 78 | 80 | 80 |
| % C.S. (70 hr/150° C.) | | | | |
| 6' Button | 39 | 31 | 33 | 43 |

*Zinc stearate, fatty acid processing aid
**Furnace Black
***Compression Set

The lead stearate provides a faster cure rate and better compression set than the lead oxide. Lead oxide provides a little more process or scorch safety, but increasing the amount of lead stearate will provide increased scorch safety. Lead acetate provides results similar to those of lead stearate. Stannous stearate provides an increased cure rate and higher press cured physicals and no loss in compression set resistance. All of these compounds may be used to vary the balance of physical properties desired.

EXAMPLE 2

In this example there is added to the master-batch described in Example 1, 0.6 weight part of 2,5-dimercapto-1,3,4-thiadiazole, one weight part of the lead oxide compound of Example 1 and the following tetraalkyl thiuram sulfides in the amounts shown in Table 2; tetramethythiuram monosulfide (TMTM) 1.5, tetramethyl thiuram disulfide (TMTD) 1.5, and tetraethyl thiuram disulfide (TETD) 2.0, dipentamethylene thiuram hexasulfide (DPTH) 2.5. Test results on the compounds and vulcanizates are set forth in Table II.

TABLE II

| Compound | 1 | 2 | 3 | 4 |
|---|---|---|---|---|
| TMTM | 1.5 | — | — | — |
| TMTD | — | 1.5 | — | — |
| TETD | — | — | 2.0 | — |
| DPTH | — | — | — | 2.5 |
| Mooney Viscometer (125° C., Large Rotor) | | | | |
| Minimum | 48 | 45 | 48 | 56 |
| $t_5$ (min) | >30 | >30 | 13.0 | 9.0 |
| $t_{35}$ (min) | >30 | >30 | >30 | >30 |
| Rheometer (12', 190° C., Micro Die) | | | | |
| ML (in-lb) | 6.2 | 6.5 | 6.2 | 7.0 |
| MH (in-lb) | 17.7 | 19.0 | 20.8 | 20.0 |
| MΔ (in-lb) | 11.5 | 12.5 | 14.6 | 13.0 |
| $t_1$, (min) | 2.2 | 1.4 | 1.2 | 0.9 |
| $t^190$ (min) | 13.0 | 8.5 | 7.5 | 7.5 |
| Press Cure (3', 190° C.) | | | | |
| Modulus 100%, psi | 480 | 600 | 650 | 700 |
| Tensile, psi | 1150 | 1380 | 1470 | 1500 |
| Elongation, % | 420 | 340 | 320 | 330 |
| Hardness-A | 73 | 77 | 76 | 78 |
| % C.S. (70 hr/150° C.) | | | | |
| 6' Buttons | 86 | 76 | 67 | 81 |
| Post Cure (4 hr., 175° C.) | | | | |
| $M_{100}$, psi | 780 | 800 | 1050 | 1200 |
| Tensile, psi | 1750 | 1730 | 1900 | 2120 |
| Elongation, % | 240 | 240 | 200 | 150 |
| Hardness-A | 75 | 80 | 82 | 75 |
| % C.S. (70 hr/150° C.) | | | | |
| 6' Button | 47 | 56 | 44 | 62 |

Using these different tetraalkyl thiuram sulfides, a range of useful scorch/cure rate behaviors is obtained that provide flexibility in designing compounds for a variety of applications.

The vulcanizates prepared in accordance with the teachings of this invention are useful in many applications where high temperature serviceability, oil resistance and weatherability are required. Typical applications are for under the hood automotive parts including gaskets, seals, packings, belting and hose; and outdoor applications such as weather stripping, sealants, and hose; and oil field use including seals and gaskets.

I claim:

1. A composition comprising (1) an acrylate rubber containing (a) from about 65 percent to about 98 percent by weight of an acrylate of the formula

wherein R is selected from the group consisting of an alkyl radical containing 1 to 10 carbon atoms and an alkoxyalkyl radical containing 2 to about 8 carbon atoms, (b) from about 0.2 percent to about 15 percent by weight of a halogen-containing monomer selected from the group consisting of halogen-containing vinylidene hydrocarbons and halogen-containing vinyl monomers having the halogen group at least two carbon atoms removed from an oxygen atom, (c) from about 0.2 percent to about 10 percent by weight of an unsaturated carboxyl-containing monomer, and (d) up to about 10 percent by weight of a copolymerizable monomer containing a terminal vinylidene group, and (2) a curative consisting essentially of about 0.4 to about 2.0 weight parts of 2,5-dimercapto-1,3,4-thiadiazole, about 0.5 to about 1.5 weight part of a fatty acid salt of lead or tin and about 1.5 to 3.5 weight parts of tetralkyl thiuram disulfide wherein the alkyl groups contain 1 to 6 carbon atoms, all weights based on 100 weight parts of acrylate rubber.

2. A composition of claim 1 wherein (a) is selected from the group consisting of ethyl acrylate, n-butyl acrylate, methoxyethyl acrylate and ethoxyethyl acrylate, (b) is selected from the group consisting of vinyl chloroacetate, allyl chloroacetate, 2-chloroethyl acrylate, 2-chloroethyl vinyl ether, vinyl benzyl chloride, 2-chloromethyl-5-norbornene, and 2-chloroacetoxymethyl-5-norbornene, (c) is selected from the group consisting of acrylic acid, methacrylic acid, and itaconic acid containing about 0.5 to 0.7 weight parts of said thiadiazole, about 2 to 3 weight parts of tetrabutyl thiuram disulfide and about 0.75 to 1.25 weight parts of lead or tin salts.

3. A composition of claim 2 wherein (a) is ethyl acrylate, (b) is vinyl benzyl chloride in amount of about 1 to 2 weight percent, (c) is acrylic or methacrylic acid in amount of about 0.2 to 0.6 weight percent and there is present about 0.6 weight parts of thiadiazole, about 2.5 weight parts of tetrabutyl thiuram disulfide and about one weight part of dibasic lead stearate or stannous stearate.

* * * * *